March 11, 1969     M. KURTZ ETAL     3,432,126
ENDLESS METALLIC SCREEN FOR THE SCREEN PORTION OF A PAPER MACHINE
Filed July 12, 1966
Fig. 1
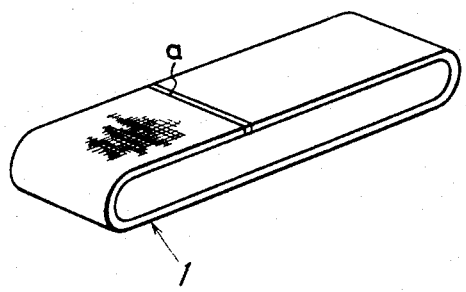
Fig. 2 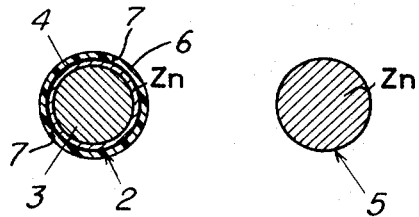 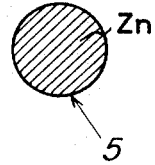 Fig. 3

United States Patent Office 3,432,126
Patented Mar. 11, 1969

3,432,126
ENDLESS METALLIC SCREEN FOR THE SCREEN PORTION OF A PAPER MACHINE
Manfred Kurtz, Reutlingen, and Lothar Bangert, Nagold, Germany, assignors to Hermann Wangner, Kommanditgesellschaft, Reutlingen, Germany
Filed July 12, 1966, Ser. No. 564,662
Claims priority, application Germany, July 13, 1965, W 39,543
U.S. Cl. 245—10
Int. Cl. B21f 31/00; C23f 13/00
2 Claims

ABSTRACT OF THE DISCLOSURE

An endless metal screen suited for use as the screen structure of a paper making machine and being formed of a strip of screening of relatively non-oxidizable metallic composition having the ends thereof secured together in a transverse soldered joint of noble metal composition. A minor quantity of the wire strands of the screening are provided with at least their outer surfaces formed of a metallic composition of a metal other than and less noble than that used for the rest of the screening wires. The less noble portions of the minor quantity wire strands thus are more readily dissolved by electro-chemical corrosion and serve as sacrifice electrodes to provide protection for the major quantity of strands in the screening.

---

The sheet forming in paper machines starts with the run up or delivery of the aqueous material-suspension upon an endless, mostly horizontally moving screen which as an example, consists of Phosphor-bronze or steel. The length of the screen may be seventy meters and according to the type of the paper to be produced, the speed of the strip may reach or go up to one thousand meters per minute.

This type of screen in the form of a strip is subjected to considerable mechanical wear and for that reason the strips have been produced of stainless steel and by means of welding have been formed into an endless band. It was, however, found that through heating of the metal at the welding point or location over and above the melting point or temperature, the metal structure developed a rough grain causing fatigue in the welding seam thus reducing the expected life span.

For this reason experiments were conducted to increase the stability of the connecting ends by soldering the band ends together and using a solder consisting of an alloy of noble metals such as alloys of gold or silver. However, there still occurred cracks at the soldering point.

The purpose of the present invention therefore is to further increase the life span of screen bands which have been formed by using solder consisting of noble metal composition, such as noble metal alloy. This is done by using a cathodic protection at the point of soldering thus damming or blocking, and preventing electro-chemical corrosion of the welding surface that may otherwise occur in connection with the aqueous mixture of the substance of the paper machine.

Cathodic protection has not heretofore been used on paper machine screens because, due to the unusually strong or heavy wear and tear on the screen, mechanical cracking thereof at the welding surface or area was unavoidable before a noticeable corrosion of the entire screen surface became apparent. By means of the present inventive arrangement however, and aside from the cathodic protection of the entire screen, an increase of the life span of the screen is obtained because of the cathodic protection secured at the welding area of the screen.

The screen according to the present invention is characterized in that it contains a number of wires which totally or partially consist of material other than the screen, being effective as sacrifice-electrodic or activanodic metal which compared to the screen metal is less noble, as for instance zinc or magnesium, such as suitable alloys thereof.

The screen wires which are effective as a sacrifice-electrode consist preferably of zinc whereas the screen itself is produced of stainless steel, bronze or tombac (copperbase zinc alloy). These wires which are thus arranged for obtaining the cathodic protection may be produced by coating a metal that is less noble than that of the screen or which consists of completely un-noble metals.

In order for an electro-chemical corrosion to arise three prerequisities are required, namely the presence of a local element or couple formed by two spatially separated places or points of different potential which are conductively connected with each other as well as a conductive connection through an electrolyte of both places or points effective or serving as electrodes. In the present case both electrodes of the couple are formed by means of the connecting parts at the soldering point of the soldering metal and the screen metal, whereas the highly acid water which runs off the screen, serves as an electrolyte.

By means of the local system or couple thus formed there occurs an electro-chemical corrosion at the connecting point of the solder and the screen metal by which the screen metal, namely the stainless steel which serves as the anode of the system, is carried off or etched away, thus causing a weakening of the soldering surface. The electro-chemical corrosion becomes even more intensive the higher the potential difference between the two electrodes of the local system or couple. It is not even necessary to the electro-chemical corrosion that the corroding metal be immersed into a large quantity of liquid serving as the electrolyte since to maintain the corrosion a liquid film will suffice.

By means of the arrangement of the wires in the screen serving as the sacrifice-electrode, the material of the screen is combined with the un-noble metal which for the protection of the screen acts as the anode and dissolves eventually. In order to check this dissolution process, these wires may be partially covered with a covering layer, such as a layer of lacquer or synthetic material (i.e. epoxy resins, PVC-lacquer, Desmodur-Desmophenlacquer or acid-hardening lacquers. The partial covering may be characterized by hairlike cracks in the lacquer. The wires forming the sacrifice-electrodes may be arranged either as warps or woofs. Preferably each fourth to sixth warp wire may be a sacrifice electrode. However, it is also possible to provide such wires of less noble material at the rim strip or marginal zone of the screen, which is either woven into the screen or has been added to the screen afterwards.

The invention accordingly comprises the features of construction, combinations of elements, and arrangement of parts, which will be exemplified in the constructions hereinafter set forth.

Other objects of the invention will in part be obvious and will in part appear from reference to the following detailed description taken in connection with the accompanying drawing, wherein like numerals identify similar parts throughout, and in which:

FIG. 1 is a perspective view to reduced scale of an endless screen of a paper making machine embodying the improvements of the present invention;

FIG. 2 is an enlarged cross-sectional view of a single strand or wire employed in the endless screen of FIG. 1 to serve as a sacrifice-electrode in accordance with the teachings of the present invention; and FIG. 3 is a cross-sectional view similar to FIG. 2 of another embodiment of the sacrifice-electrode wire or strand.

In FIG. 1 is shown endless screen 1 of a conventional paper making machine, formed for example from a strip of stainless steel screening, and having the ends thereof soldered together in a soldered joint *a* to form the endless band shown. The soldered joint *a* may be formed in conventional manner with a suitable soldering material, e.g. an alloy of noble metal such as silver. Transversely spaced warp wires of this screening, e.g. every fourth one thereof, is formed as a strand which may either be a core wire coated with sacrifice-electrode material in accordance with the above teaching, or be a strand of such sacrifice-electrode material.

As is illustrated in FIG. 2, such a sacrifice-electrode strand 2 may have a core 3 of suitable base metal, such as that from which the other warp wires are formed, e.g. stainless steel, covered with a layer of the sacrifice-electrode material, e.g. zinc or magnesium or an alloy thereof. In FIG. 3 is illustrated another sacrifice-electrode strand 5 which may be a wire formed of the sacrifice-electrode material.

As indicated before, the dissolution process of the sacrifice anode can be checked by partially covering it with a layer of a lacquer, or light synthetic material. This can be seen by reference to FIGURE 2 wherein the synthetic covering layer 6 is shown. Moreover, the synthetic layer can be provided with hair-like cracks as at 7 to further retard the dissolution action.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. An endless metal screen suited for use as the screen structure of a paper making machine with the major quantity of the wire strands thereof formed of relatively non-oxidizable metallic composition and formed of a strip of screening having the ends thereof secured together in a transverse soldered joint of noble metal composition, characterized in the embodiment therein of a minor quantity of the wire strands thereof having at least their outer surfaces formed of metallic composition of a metal other than that used in the major quantity of the wire strands thereof and which is less noble than the metallic composition with which said major quantity of the wire strands are formed.

2. An endless metal screen in accordance with claim 1 wherein said minor quantity of wire strands are at least partially covered with a layer of a synthetic material overlaying the less noble metallic composition, said synthetic material layer having hair-like cracks therein.

References Cited

UNITED STATES PATENTS

| | | | |
|---|---|---|---|
| 2,331,814 | 10/1943 | Taylor | 245—10 |
| 2,605,201 | 7/1952 | Howe | 204—148 |
| 2,851,233 | 9/1958 | Hayden | 245—10 |
| 3,260,661 | 7/1966 | Kemp et al. | 204—148 |

RICHARD J. HERBST, *Primary Examiner.*

U.S. Cl. X.R.

204—148, 197